US008505173B2

(12) United States Patent
Pitts et al.

(10) Patent No.: US 8,505,173 B2
(45) Date of Patent: Aug. 13, 2013

(54) ELEVATOR LOAD BEARING TERMINATION ASSEMBLY

(75) Inventors: John T. Pitts, Avon, CT (US); Boris G. Traktovenko, Avon, CT (US); Kotur Srinivasan Raghavan, Secunderabad (IN); Vijal Mohan Veeramalla, Hyderabad (IN); Laxmipathi Chilaveni, Hyderabad (IN); Kandi Puroshotham Pavan Kumar, Gulbarga (IN); Shailendra Singh, Allahabad (IN); Saravana Kumar Kandasami, Hyderabad (IN)

(73) Assignee: Otis Elevator Company, Farmington, CT (US)

( * ) Notice: Subject to any disclaimer, the term of this patent is extended or adjusted under 35 U.S.C. 154(b) by 926 days.

(21) Appl. No.: 12/376,198

(22) PCT Filed: Aug. 29, 2006

(86) PCT No.: PCT/US2006/033569
§ 371 (c)(1),
(2), (4) Date: Feb. 3, 2009

(87) PCT Pub. No.: WO2008/027030
PCT Pub. Date: Mar. 6, 2008

(65) Prior Publication Data

US 2009/0307876 A1 Dec. 17, 2009

(51) Int. Cl.
*B66B 7/08* (2006.01)
*F16G 11/04* (2006.01)

(52) U.S. Cl.
USPC .......................................... 24/136 R; 403/211

(58) Field of Classification Search
USPC ................... 24/136 R, 136 L, 115 M, 136 K; 403/211, 314, 374.1; 187/411, 412, 404, 187/406; 294/102.1
See application file for complete search history.

(56) References Cited

U.S. PATENT DOCUMENTS 2,130,040 A 9/1938 Siler
2,482,231 A 9/1949 white (Continued)

FOREIGN PATENT DOCUMENTS

CN 1395539 2/2003
CN 1424975 6/2003

(Continued)

OTHER PUBLICATIONS

Search Report and Written Opinion mailed on May 18, 2007 for PCT/US2006/033569.

(Continued)

*Primary Examiner* — Robert J Sandy
*Assistant Examiner* — Rowland D Do
(74) *Attorney, Agent, or Firm* — Carlson, Gaskey & Olds, P.C.

(57) ABSTRACT

A socket device (10) for securing an end of a load bearing member (22) includes first socket members (26*a* and 26*b*) and second socket members (28*a* and 28*b*) that are distinct, separate pieces of material. The second socket members (28*a* and 28*b*) are spaced apart from each other at a desired angle and rigidly secured on one side to one of the first socket members (26*a*) and on another side to the other first socket member (26*b*) to form the socket (24). A disclosed example includes cooperating tabs (38) and recesses or openings (34) for securing the socket members together in a rigidly fixed alignment.

20 Claims, 2 Drawing Sheets

(56) References Cited

U.S. PATENT DOCUMENTS

| | | | | | |
|---|---|---|---|---|---|
| 2,540,887 | A * | 2/1951 | Hyatt | | 24/68 R |
| 2,977,654 | A | 4/1961 | Page | | |
| 3,335,470 | A | 8/1967 | Baer | | |
| 3,811,155 | A | 5/1974 | Stafford | | |
| 3,825,984 | A * | 7/1974 | Linko et al. | | 29/889.721 |
| 3,905,711 | A * | 9/1975 | Rogers | | 403/16 |
| 4,295,749 | A | 10/1981 | McBride | | |
| 4,561,154 | A * | 12/1985 | Briscoe et al. | | 24/136 K |
| 4,572,565 | A | 2/1986 | Epstein | | |
| 4,602,891 | A | 7/1986 | McBride | | |
| 4,643,609 | A * | 2/1987 | Biass | | 403/369 |
| 4,716,991 | A * | 1/1988 | Riechers | | 187/409 |
| 4,718,788 | A | 1/1988 | Briscoe | | |
| RE32,847 | E * | 1/1989 | Briscoe et al. | | 24/136 R |
| 5,199,137 | A | 4/1993 | Edwards | | |
| 5,553,360 | A | 9/1996 | Lucas et al. | | |
| 5,988,929 | A * | 11/1999 | Doan | | 403/281 |
| 6,058,575 | A | 5/2000 | Dagan | | |
| 6,345,419 | B1 | 2/2002 | Traktovenko | | |
| 6,394,007 | B2 * | 5/2002 | Lewis et al. | | 109/59 R |
| 6,484,368 | B1 * | 11/2002 | Rivera et al. | | 24/115 R |
| 6,513,204 | B2 * | 2/2003 | Rivera et al. | | 24/136 R |
| 6,662,408 | B2 | 12/2003 | Perez et al. | | |
| 6,994,487 | B2 * | 2/2006 | Traktovenko et al. | | 403/314 |
| 7,607,204 | B2 * | 10/2009 | Ach | | 24/136 R |
| 2002/0154945 | A1 * | 10/2002 | Ericson | | 403/374.1 |
| 2004/0089641 | A1 | 5/2004 | Launais et al. | | |
| 2005/0132873 | A1 | 6/2005 | Diaz Supisiche et al. | | |

FOREIGN PATENT DOCUMENTS

| | | |
|---|---|---|
| DE | 2511953 | 9/1976 |
| DE | 3143217 | 5/1983 |
| EP | 1642854 | 4/2006 |
| FR | 2789609 | 8/2000 |
| JP | 1242385 | 9/1989 |
| JP | 5039180 | 2/1993 |
| JP | 5172190 | 7/1993 |
| JP | 2001165245 | 6/2001 |
| SU | 1318758 | 6/1987 |
| SU | 1736982 | 5/1992 |
| WO | 0073131 | 12/2000 |
| WO | 0151400 | 7/2001 |
| WO | 0153185 | 7/2001 |
| WO | 02085772 | 10/2002 |

OTHER PUBLICATIONS

Notification of Transmittal of the International Preliminary Report on Patentability mailed on Dec. 5, 2008 for PCT/US2006/033569.

Russian Office action dated Nov. 30, 2011. Russian Federation Application No. 2009111408.

* cited by examiner

ELEVATOR LOAD BEARING TERMINATION ASSEMBLY

FIELD OF THE INVENTION

This invention generally relates to static connector systems. More particularly, this invention relates to a device for securing an end of a load bearing arrangement.

DESCRIPTION OF THE RELATED ART

Elevator systems typically include some form of load bearing member, such as roping or a belt for supporting and moving the cab through the hoistway as desired. In some configurations, the belt couples a counterweight to the cab. Regardless of the specific configuration of the elevator system, it typically is necessary to secure ends of the belt to an appropriate structure within the elevator system.

A variety of configurations of assemblies for securing the ends of a belt in an elevator system have been used. One example includes a cast socket and wedge arrangement where a portion of the belt is secured between the socket and the wedge. One disadvantage is that the casting process is relatively expensive and the integral nature of the casting arrangement limits access to the belt-engaging surfaces within the socket. This makes it difficult to treat the belt-engaging surfaces, such as by knurling the belt-engaging surfaces, to enhance the gripping characteristics. Additionally, it is difficult to achieve tolerances desirable for uniform load distribution.

Another example socket is formed from sheet metal and includes two sheet metal parts bent generally into a U-shape. The U-shaped parts are then joined with a dovetail joint and welded along the joint to form the socket. Shoe parts with knurled belt-engaging surfaces are inserted in the sheet metal parts. One drawback of this arrangement is a limited load carrying capacity. It is often difficult to bend sheet metal into the desired configuration if the sheet metal is over ¼ inch thick. Therefore, it is typically unfeasible to use thicker sheet metal to increase the load carrying capacity of the socket and larger and more cumbersome shoe parts are required.

Another shortcoming of current arrangements is that the arrangements do not provide the desired dimensional tolerances for many situations. One particular issue is presented by the need to establish and maintain a parallel alignment between opposite sides of the socket and opposite sides of the wedge. Without a truly parallel alignment, the forces on the load bearing member are not evenly distributed and belt life may be compromised.

There is a need for an improved elevator load bearing termination arrangement. This invention addresses that need and overcomes the shortcomings described above.

SUMMARY OF THE INVENTION

One example socket for securing an end of an elongated load bearing member in an elevator system includes at least one first socket member that at least partially forms the socket. Second socket members that are separate and distinct from each other and from the first socket member are spaced apart from each other for receiving a load-bearing member. Each second socket member is rigidly fixed to the at least one first socket member.

One example method of making a socket for use in an elevator system uses a first socket member and second socket members that are separate, distinct pieces. The method includes inserting a plurality of tabs that extend either the first socket member or the second socket members into a corresponding plurality of recesses in the other of the first socket member or the second socket members. This rigidly secures the first socket member and the second socket members together.

The various features and advantages of this invention will become apparent to those skilled in the art from the following detailed description of a currently preferred embodiment. The drawings that accompany the detailed description can be briefly described as follows.

DETAILED DESCRIPTION OF THE PREFERRED EMBODIMENT

Figure 1:
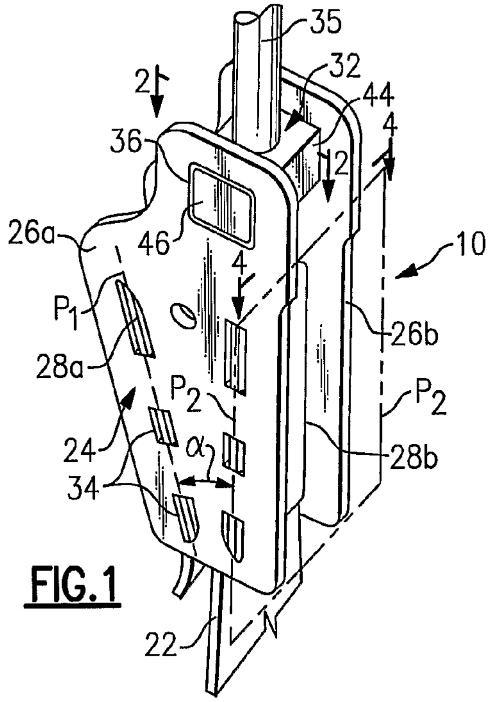
FIG. 1 illustrates a perspective view of an example socket device.
Figure 2:
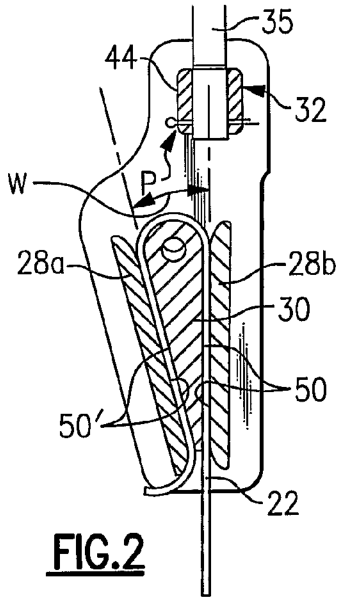
FIG. 2 illustrates a view of the socket device along the section line 2-2 shown in FIG. 1.
Figure 3:
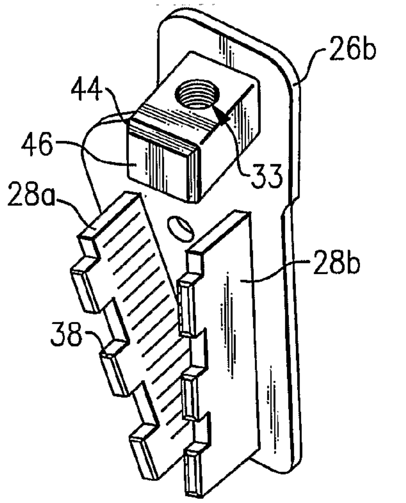
FIG. 3 illustrates a view of selected portions of the socket device of FIG. 1.

FIGS. 1 through 3 illustrate a device 10 for handling an end of a load bearing member 22 in an elevator system. The load bearing member 22 in the illustrated example is a flat belt, however, any load bearing member within an elevator system that can be accommodated using a socket and wedge arrangement designed according to this invention may be used. The term "belt" as used in this description should not be construed in its strictest sense. It should be considered synonymous with roping or load bearing member.

In the illustrated example, a socket 24 includes side plates **26*a* and 26*b* (i.e., first socket members) and keeper parts 28*a* and 28*b* (i.e., second socket members) between the side plates 26*a* and 26*b*. The keeper parts 28*a* and 28*b* and the side plates 26*a* and 26*b* are distinct, separate pieces that are rigidly secured together and cooperate with a wedge 30 to secure the end of the load bearing member 22 in a desired position. The example device 10 has advantages in simplifying the manufacture and assembly of the socket 24 and allowing scaling of the design to a variety of load requirements. Additionally, the example device 10** facilitates flatness, parallelism, and dimensional control, which eliminates the need for insert shoe parts.

As can be appreciated from one or more of the drawings, the device 10 includes relatively few parts, including the side plates **26*a* and 26*b*, the keeper parts 28*a* and 28*b*, the wedge 30, and a connector portion 32 that are assembled together to form the socket 24**.

In the illustrated example, the side plates **26*a* and 26*b* each include recesses 34 such as slots for assembling the socket 24. In this example, the recesses 34 comprise openings through each side plate 26. Each of the keeper parts 28*a* and 28*b* includes tabs 38 with beveled end portions that are received at least partially into a corresponding recess 34. In the illustrated example, the tabs 38** include a generally rectangular cross-sectional profile. Given this description, one of ordinary skill in the art will recognize suitable profiles other than rectangular to meet their particular needs.

The side plates 26*a* and 26*b* also each include a connector opening 36 for receiving the connector portion 32. In the illustrated example, the connector portion 32 includes a bridge member 44 having an internally threaded opening 33 that receives a rod 35 that secures the device 10 to a support in a known manner. In some examples, a pin P (FIG. 2) is used to secure the rod 35 and bridge member 44 together.

In one example, the recesses 34, connector openings 36, tabs 38, and shape of the side plates 26*a* and 26*b* and keeper parts 28*a* and 28*b* are laser cut from a metal block. Given this description, one of ordinary skill in the art will recognize alternative processes and materials for making the socket 24.

In the illustrated example, the side plates 26*a* and 26*b* are spaced a uniform distance apart (i.e., are parallel), and the keeper parts 28*a* and 28*b* are transverse to each other and generally perpendicular to the side plates 26*a* and 26*b*. The terms "parallel" and "perpendicular" as used in this description refer to the nominal relative positioning between the parts and are not intended to be restrictive in a strict geometrical sense.

In the illustrated example, some of the recesses 34 are aligned along a first plane $P_1$ and other recesses 34 are aligned along a second plane $P_2$ with a desired oblique angle $\alpha$ such as 15° between them. In this example, the angle $\alpha$ corresponds to the position of the keeper parts 28*a* and 28*b* relative to one another.

Figure 4:
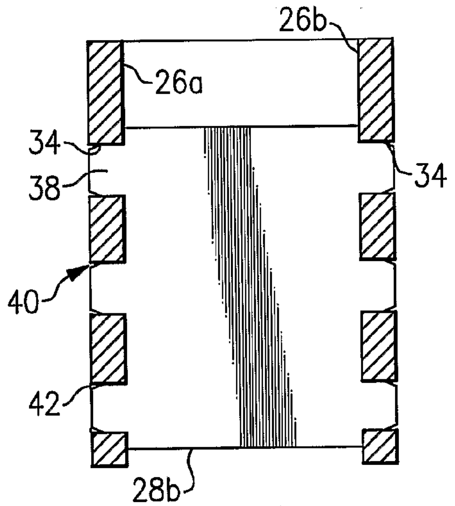
FIG. 4 illustrates locking between side plates and keeper parts of the socket device of FIG. 1 along the section line 4-4 shown in FIG. 1.

FIG. 4 illustrates a view along the section line shown in FIG. 1 and shows a locking connection between the tabs 38 of the keeper part 28*b* and the recesses 34 of the side plates 26*a* and 26*b*. The locking connection for the keeper part 28*a* is similar. The locking connection provides the benefit of maintaining the keeper parts 28*a* and 28*b* at the desired angle while uniformly distributing shear loads from the keeper parts 28*a* and 28*b* to the side plates 26*a* and 26*b*. In the disclosed example, using a plurality of tabs also provides multiple locations for load distribution.

In this example, the beveled end portions of the tabs 38 form channels 40 with the recesses 34. In one example, the channels 40 receive a filler material 42 (e.g., braze, solder, or weld filler material) to secure the keeper parts 28*a* and 28*b* together with the side plates 26*a* and 26*b*. Although the illustrated example shows the beveled end portions of the tabs 38 being flush with the side plates 26*a* and 26*b*, in some examples the tabs 38 extend completely through the recesses 34 or only partially into the recesses 34.

Likewise, the connector portion 32 includes a bridge member 44 having beveled ends 46 that are received into the respective connector openings 36. This provides a locking connection similar the locking connection between the tabs 38 and the recesses 34. The bridge member 44 transfers load from the side plates 28*a* and 28*b* to the rod 35. Given this description, one of ordinary skill in the art will recognize suitable bridge member 44 shapes and configurations other than what is shown to meet their particular needs.

In one example, one or more the surfaces of the wedge 30 and keeper parts 28*a* and 28*b* are treated to enhance the gripping characteristics of the socket 24. In one example, contact surfaces 50 of the keeper parts 28*a* and 28*b* and wedge 30 are milled, knurled, or grooved in a known manner to increase friction with the load bearing member 22. The separate, distinct keeper parts 28*a* and 28*b* provide the benefit of being easily accessible for treatment before assembly with the side plates 26*a* and 26*b*.

As can be appreciated from the drawings and description, the designed size of the side plates 26*a* and 26*b* and keeper parts 28*a* and 28*b* can be scaled up or down to accommodate a variety of desired load bearing capacities. Since the side plates 26*a* and 26*b* and keeper parts 28*a* and 28*b* are formed or cut from metal blocks instead of bent sheet metal as in some prior designs, there are fewer manufacturing limitations that inhibit scale up compared to previously known arrangements. Additionally, this facilitates flatness, parallelism, and dimensional control.

In another example, the angle $\alpha$ and a wedge angle $\omega$ (FIG. 2) are unequal. In one example, the wedge angle $\omega$ is greater than the angle $\alpha$. In a further example, the wedge angle $\omega$ is ½° greater than the angle $\alpha$.

This provides the advantage of increasing the breaking strength of the load bearing member 22. In some prior arrangements, breaking of the load bearing member occurs at the entrance of the socket. At this point, tensile stress from the load is a maximum. The stress in the load bearing member is a combination of the tensile stress and orthogonal compressive stress from wedging force. As a result, with evenly distributed wedging pressure, von Mises stress at the entrance of the socket is a maximum. By selecting the right geometry of wedge/socket surfaces, the pressure is redistributed in such a way that maximum pressure will be inside of the socket where tensile stress is lower. That will increase the breaking force of the load bearing member.

Figure 5:
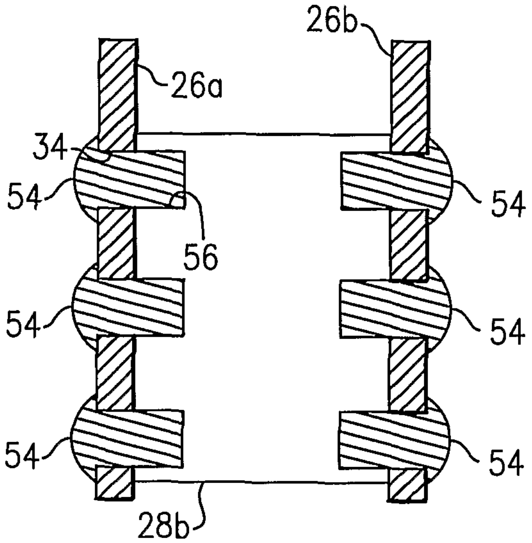
FIG. 5 shows a modified example of locking the keeper parts and side plates together with a fastener.

FIG. 5 illustrates a modified example. In this example, a fastener 54 extends through each of the recesses 34 of the side plates 26*a* and 26*b* with corresponding openings 56 in the keeper parts 28*a* and 28*b* to secure the device 10 together. In one example, the fastener 54 and openings 56 are threaded to facilitate assembly.

Figure 6:
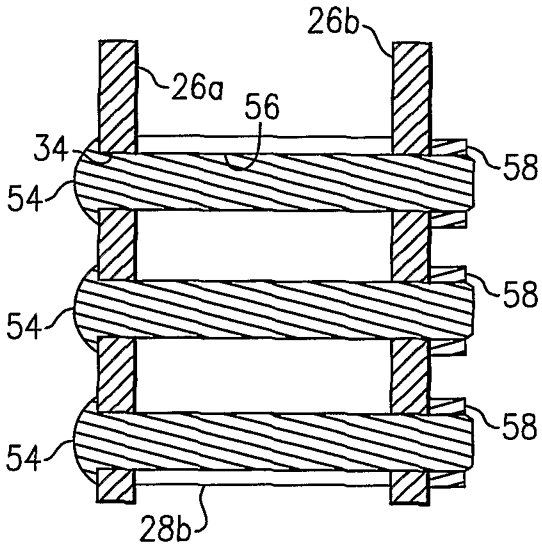
FIG. 6 shows a modified example of locking the keeper parts and side plates together with a bolt.

FIG. 6 illustrates another modified example, wherein the fasteners 54 are bolts that extend entirely through the keeper parts 28*a* and 28*b* and extend from each side of the side plates 26*a* and 26*b*. The bolts are secured in place using a nut 58. Given this description, one of ordinary skill will recognize other ways of securing the parts together to meet their particular needs.

Figure 7:
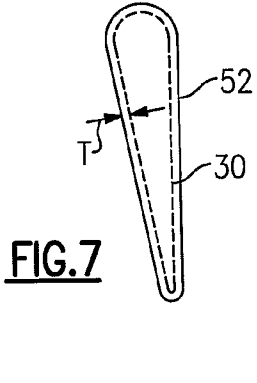
FIG. 7 schematically shows an example positioning member used to precisely assemble a socket device.

In one example, to facilitate precise assembly of the device 10, a positioning member 52 as shown in FIG. 7 is used to precisely align the side plates 26*a* and 26*b* and keeper parts 28*a* and 28*b*. In the illustrated example, the positioning member 52 is approximately the same combined size and shape as a corresponding wedge 30 (shown in phantom) and load bearing member 22 that will be used with that particular socket 24. The thickness T of the load bearing member 22 is included on the dimensions of the positioning member 52 in this example.

To assemble the device 10, the tabs 38 of the keeper parts 28*a* and 28*b* are fit into the recesses 34 of the side plates 26*a* and 26*b*. In one example, there is some play between the tabs 38 and openings 36. The positioning member 52 is then inserted into the socket 24 between the keeper parts 28*a* and 28*b* and side plates 26*a* and 26*b*. A positioning member in the shape of the bridge member 44 is also used for aligning the tops of the side plates 28*a* and 28*b*. The keeper parts 28*a* and 28*b*, side plates 26*a* and 26*b*, and positioning member 52 are then clamped together and the distinct pieces are welded, brazed, or soldered (for example) to secure the parts together before removing the positioning member 52. The positioning member 52 maintains a precise alignment between the side plates 26*a* and 26*b* and keeper parts 28*a* and 28*b* during the welding, brazing, or soldering process. This feature provides the benefit of establishing a precise socket 24 assembly, which is desired for maintaining a wedge in a desired position and achieving uniform load distribution on a load bearing member.

The preceding description is exemplary rather than limiting in nature. Variations and modifications to the disclosed embodiment may become apparent to those skilled in the art that do not necessarily depart from the essence of this invention. The scope of legal protection given to this invention can only be determined by studying the following claims.

We claim:

1. A socket for securing an end of an elongated load bearing member, the socket comprising:

two first socket members each comprising a separate and distinct piece that at least partially form a socket; and two second socket members each comprising a separate and distinct piece, the second socket members are spaced apart from each other for receiving a load-bearing member between the second socket members, each second socket member interconnecting with openings in each of the two first socket members such that the two first socket members lock together with the two second socket members, wherein the first socket members are parallel to each other and the second socket members are non-parallel to each other, and wherein each of the two second socket members has tabs that interconnect with the openings in each of the two first socket members.

2. The socket device as recited in claim 1, wherein each of the two first socket members are rigidly fixed to each of the two second socket members.

3. The socket device as recited in claim 2, wherein the two first socket members are parallel to each other.

4. The socket device as recited in claim 1, wherein the two second socket members are perpendicular to the at least one of the two first socket members.

5. The socket device as recited in claim 1, wherein the two first socket members include a connector opening that receives at least a portion of a connector member for connecting the socket to a support.

6. The socket device as recited in claim 5, wherein the connector opening includes a peripheral surface and the connector member includes a beveled end that forms a channel with the peripheral surface.

7. The socket device as recited in claim 1, wherein each of the tabs is a rectangular protrusion.

8. The socket device as recited in claim 1, wherein the openings each have a peripheral surface and the tabs include beveled ends that form channels with the peripheral surfaces.

9. The socket device as recited in claim 8, further comprising a filler material in the channel, the filler material being selected from the group consisting of braze material, solder material and weld material.

10. A socket for securing an end of an elongated load bearing member, the socket comprising:

two first socket members each comprising a separate and distinct piece that at least partially form a socket;

two second socket members each comprising a separate and distinct piece, the second socket members are spaced apart from each other for receiving a load-bearing member between the second socket members, and each second socket member is rigidly fixed to at least one of the two first socket members, wherein the two first socket members each comprise a locking feature and the two second socket members each comprise a corresponding locking feature to secure the two second socket members to the two first socket members, wherein the locking feature comprises recesses that respectively extend at least partially into each of the two first socket members and the corresponding locking features comprise tabs that respectively extend from each of the two second socket members into respective ones of the recesses, wherein the recesses of at least one of the two first socket members comprise first openings arranged along a first plane and second openings arranged along a second plane and that is transverse to the first plane; and a wedge located between the second socket members, the wedge having an associated wedge angle that is different from an angle between the first plane and the second plane.

11. The socket device as recited in claim 10, wherein the first plane and the second plane form an angle of about 15°.

12. The socket device as recited in claim 10, wherein the wedge angle is greater than the angle between the first plane and the second plane.

13. The socket device as recited in claim 12, wherein the wedge angle is ½° greater than the angle between the first plane and the second plane.

14. The socket device as recited in claim 10, wherein some of the tabs extending from one of the second socket members extend from one lateral side thereof and other of the tabs extending from the one of the second socket members extend from an opposed lateral side thereof.

15. A method of making a socket for use in an elevator system using two first socket members that at least partially form the socket, and two second socket members, wherein the first socket members and second socket members are all separate, distinct pieces, comprising:

rigidly fixing each of the two second socket members to each of the two first socket members to at least partially form a socket between the two second socket members, wherein the second socket members are spaced apart from each other for receiving a load-bearing member between the second socket members, each second socket member interconnecting with openings in each of the two first socket members such that the two first socket members lock together with the two second socket members, wherein the first socket members are parallel to each other and the second socket members are non-parallel to each other, and wherein each of the two second socket members has tabs that interconnect with the openings in each of the two first socket members.

16. The method as recited in claim 15, including inserting the tabs that extend from the two second socket members into the openings in the two first socket members to rigidly secure the two first socket members and the two second socket members together.

17. The method as recited in claim 16, including welding together the tabs and the openings.

18. The method as recited in claim 16, including inserting a positioning member between the second socket members to achieve a spacing between the second socket members that is equal to a combined size of a wedge and a load-bearing member.

19. The method as recited in claim 18, comprising achieving a desired alignment of the second socket members corresponding to a configuration of the positioning member.

20. The method as recited in claim 18, including clamping the positioning member between the second socket members.

* * * * *